Nov. 4, 1969  E. B. WILFORD  3,475,905
INTERNAL COMBUSTION ENGINE
Filed Jan. 23, 1967  2 Sheets-Sheet 1
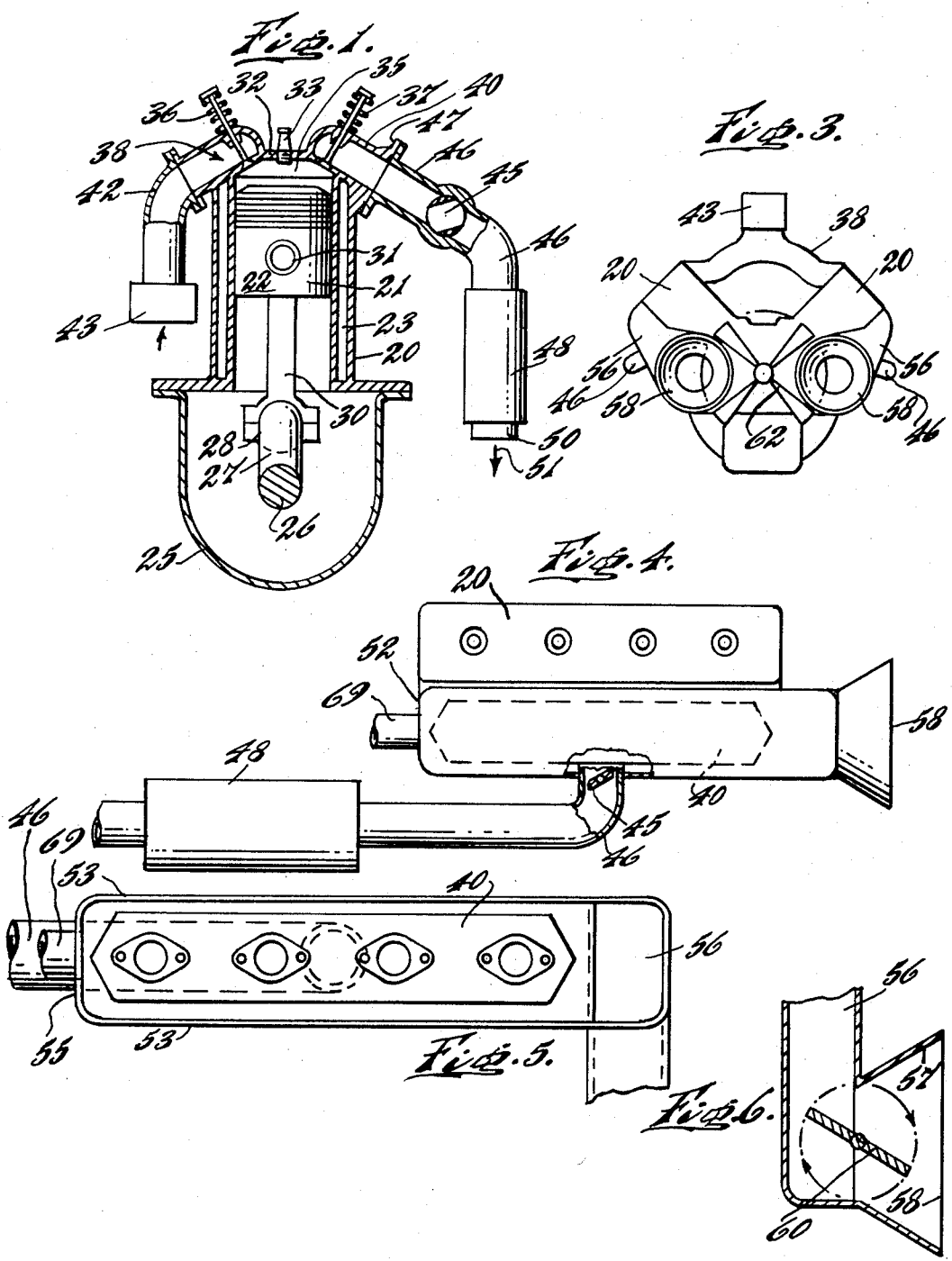
INVENTOR.
E. Burke Wilford
BY
ATTORNEYS

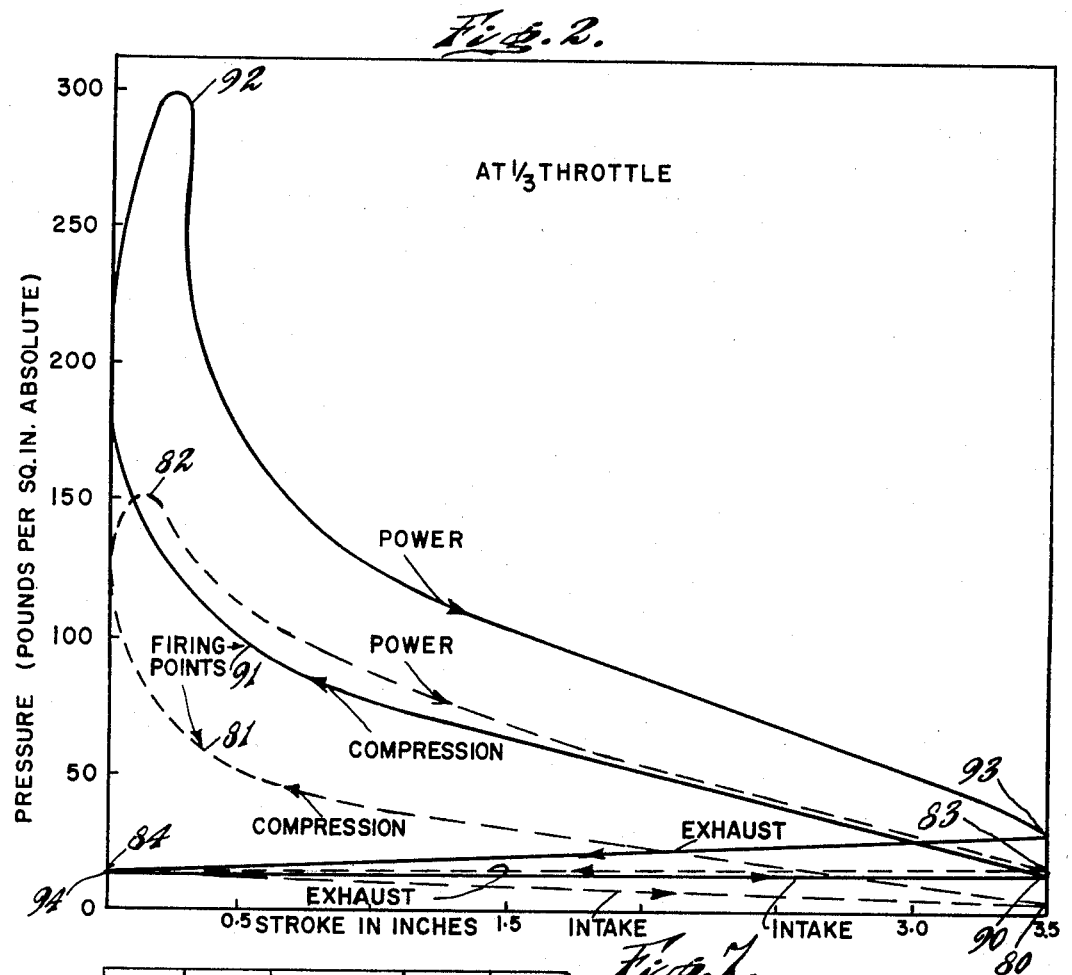
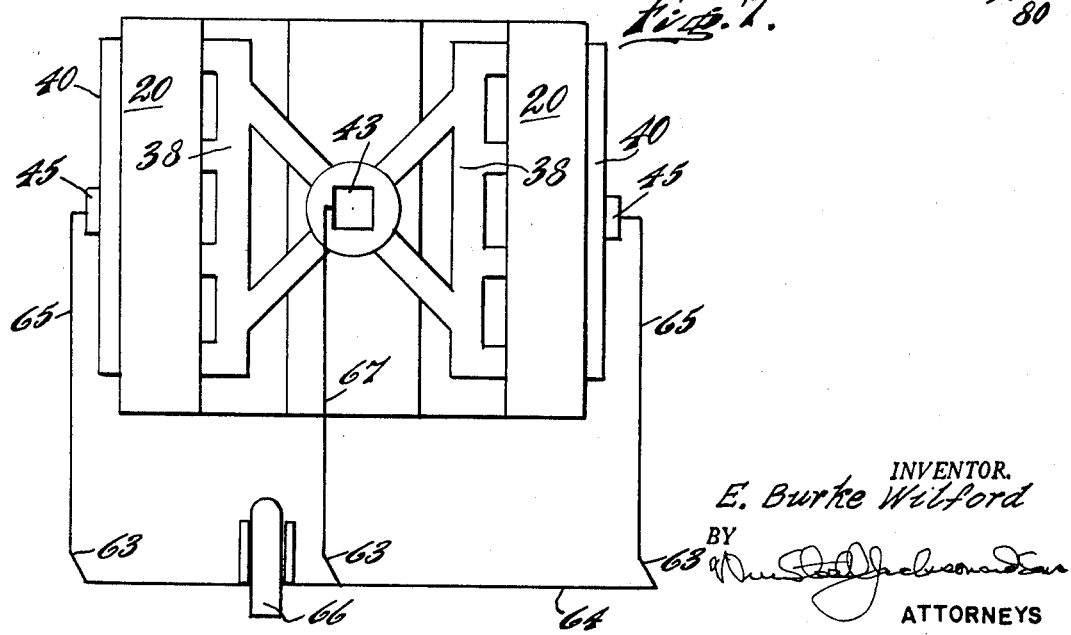

United States Patent Office 3,475,905
Patented Nov. 4, 1969

3,475,905
INTERNAL COMBUSTION ENGINE
Edward Burke Wilford, 300 Linden Ave.,
Merion Station, Pa. 19066
Filed Jan. 23, 1967, Ser. No. 610,985
Int. Cl. F01n 3/00; F02d 31/00
U.S. Cl. 60—30    5 Claims

ABSTRACT OF THE DISCLOSURE

The present invention improves the efficiency of an internal combustion engine at part throttle and reduces the toxicity of the exhaust gases, smog, and solids, by achieving more complete combustion than in the prior art. This is effected by eliminating the carburetor throttle valve on the intake manifold, installing a throttle valve in the exhaust manifold, and maintaining the exhaust manifold at an elevated temperature.

---

This invention relates to internal combustion engines and more particularly to the control of the combustion therein.

A purpose of the invention is to obtain higher efficiency in an internal combustion engine at part throttle where most automobile driving occurs.

A further purpose is to substantially eliminate throttling on the intake side of an internal combustion engine with little vacuum at end of intake stroke.

A further purpose is to throttle the exhaust of an internal combustion engine to provide engine control.

A further purpose is to keep the temperature of the exhaust manifold of an internal combustion engine at a controlled elevated temperature.

A further purpose of the invention is to regulate the amount of fuel introduced into the engine for controlling speed by throttling the exhaust.

A further purpose of the invention is to reduce the percentage of carbon monoxide and nitrous oxide, etc. in the exhaust gases of internal combustion engines.

A further purpose is to eliminate the conventional or butterfly throttle valve on the intake side of an engine.

A further purpose is to provide an effective apparatus for preventing the release of contaminates from the exhaust and tail pipe of internal combustion engine.

A further purpose is to increase efficiency and reduce toxic exhaust gases in internal combustion engines at part power.

A further purpose is to optionally provide a catalyst or extra air in the exhaust manifold.

A further purpose is to more completely burn the combustible fuels used in an internal combustion engine.

A further purpose is to obtain increased engine efficiency and reduce toxicity in exhaust gases by eliminating a throttle at the intake manifold, throttling at the exhaust, and maintaining the exhaust manifold at an elevated temperature.

A further purpose is to obtain complete combustion of any unburned gases leaving the engine cylinders and gasoline additives.

A further purpose is to burn most of unburned gases in the exhaust manifold and muffler.

Further purposes appear in the specifications and claims.

In the drawings, I have chosen to illustrate one only of the numerous embodiments in which my invention may appear, selecting the form shown from the standpoints of convenience in illustration, satisfactory operation, and clear demonstration of the principles involved.

FIGURE 1 is a schematic vertical section of a conventional cylinder in an internal combustion engine in combination with the invention.

FIGURE 2 is a graph showing the pressure in the cylinder as a function of the stroke in inches of a conventional engine and an engine in accordance with the invention.

FIGURE 3 is a vertical end elevation of a conventional V–8 engine modified with the invention.

FIGURE 4 is a top plan view of one side of a V–8 engine in accordance with the invention.

FIGURE 5 is a side elevation of the manifold detached from the engine and viewed from the engine side, and shroud with the exhaust pipe, shroud, and tail pipe being partially broken away.

FIGURE 6 is a fragmentary side elevation of the front scoop end of the shroud over the exhaust manifold.

FIGURE 7 is a schematic top view of a V–8 engine with the controls of the invention.

Describing in illustration but not in limitation and referring to the drawings:

Effort is constantly being made in the construction and operation of internal combustion engines to achieve certain desired results. Much of this effort has been directed to the problem of increasing power and engine efficiency which means in effect, increasing the work output of an engine for a given amount of fuel. Of recent interest, but of great importance, has been the desire to reduce the amount of toxic exhaust products. A common solution to both these problems appears to be the improved and more complete burning of the fuels of combustion in the cylinder and exhaust manifold and muffler.

This invention deals with a method and apparatus in a combustion engine for improving fuel combustion so that engine efficiency is increased and the toxicity of the exhaust gases is reduced.

The principles of construction and operation of conventional four cycle internal combustion engines are widely known and understood, and are set forth in great detail in numerous texts and publications. No effort will be made to set forth such detail in the present description but only those details which are covered by the present invention will be specified. Essentially, such internal combustion engines comprise a series of cylinders with pistons mounted therein, intake and exhaust valves on each of the cylinders, an intake manifold to the intake valves for distributing equally the air and fuel into the various cylinders, an exhaust manifold from the exhaust valves, and vaporizing and metering means for the combustible fuel in the intake manifold.

The conventional engine has a carburetor just in front of the entrance to the intake manifold which has mixing means for forming a combustible mixture of the gas and air, and flow control means, such as a butterfly valve, for controlling the amount of charge to the cylinder. The exhaust manifold is vented to the atmosphere, through a muffler, and the exhaust manifold is cooled by forced air from a belt driven cooling fan.

In the present invention, the desired results as set forth above are achieved by eliminating, during operation of the engine at speeds other than idling, any valve or throttle means in the carburetor or in the intake manifold, by installing in the exhaust manifold valve means for selectively throttling the exhaust, and by covering the exhaust manifold with a heat resisting and insulated shroud, wherein controlled amounts of cooling air can be passed, to maintain the exhaust manifold at an elevated temperature.

As the throttle valve in the exhaust manifold is closed, the back pressure is built up to the point where the power is properly reduced. This also leaves a small portion of the partially burned mixture in the cylinder so that the new mixture is drawn in approximately in proportion to the amount of power required.

This gives substantially higher compression at ignition at part throttle than in conventional engines. This is important because most engine operation takes place at part throttle. Additionally, this increase in compression at ignition remains substantially constant through all positions of partial throttle.

By way of an example, the fuel consumption will be approximately 7/10 pound per horsepower hour at ¼ throttle, while conventional 4-cycle engine under comparable conditions will usually exceed 1.0 pound per horsepower hour.

In the carburetor engine, the butterfly valve is partially closed at the power required for normal operation. This creates a partial vacuum at the end of the intake stroke in relation to the closing of the throttle. It is estimated at one-third throttle at the absolute pressure of less than one-half an atmosphere (14.7 pounds per sq. inch at sea level) or seven pounds per sq. inch absolute at the end of the intake stroke in the cylinder.

In the exhaust throttle engine, the back pressure created by the closing of the exhaust throttle at one-third power leaves some of the exhaust gases in the cylinder at the end of the exhaust stroke and during the intake stroke enough additional fuel and air is sucked in so that the pressure in the cylinder is approximately atmospheric with the proper valve timing. Therefore, the compression at firing is double that of the carburetor and butterfly valve controlled engine. Therefore, the compression at firing in an 8 to 1 compression ratio is 56 pounds per sq. inch in the conventional engine, and double that or 112 pounds per sq. inch in the invented exhaust throttled engine.

It is well known that the efficiency of an internal combustion engine varies with the compression at the point of firing and the frictional losses and the following table shows the approximate fuel consumption in pounds per horsepower hour at various throttle settings in an average production automobile setting of an engine with similar heat and friction losses.

|  | Throttle in intake | Throttle in exhaust |
| --- | --- | --- |
| Full throttle | 0.60 | 0.60 |
| 75% throttle | 0.70 | 0.65 |
| 50% throttle | 0.85 | 0.70 |
| 25% throttle | 1.00+ | 0.75 |

In summary, the major defect of the standard internal combustion engine as used in conventional automobiles is that the partial vacuum at the end of the intake stroke caused by the butterfly valve so rapidly decreases the efficiency at average throttle. This restriction in the intake for throttling requires a richer mixture as the power is reduced and a large increase in obnoxious substances in the exhaust, not to mention poor carburetor adjustments. Therefore exhaust throttle is an essential for reducing cost of operation for the average individual in his urban and suburban existence. The use of the exhaust manifold for further clearing of exhaust gases is important to public health and the eventual elimination of the unhealthy air conditions.

Considering the invention in detail, I show in the drawings a block 20 having cylinders 21 slidably mounting therein pistons 22. The block 20 has surrounding each of the cylinders cooling ports 23 wherein cooling liquid is circulated in a well known manner. A crankcase 25 is connected at the bottom of the block by suitable bolts and contains therein lubricant surrounding crankshaft 26 having throw 27 connected at 28 to connecting rod 30 journaled on wrist pin 31 in piston 21. Connected at the top of the block 20 is head 32 secured by suitable bolts.

Spark plugs 33 are secured through the head 32 into combustion chambers 35. Intake valves 36 and exhaust valves 37 extend from intake manifold 38 and exhaust manifold 40 to control gas flow to and from chamber 35. Connected to the intake manifold at 41 is fuel and air mixture supply line 42 through which a combustible mixture passes into the intake manifold 38.

Conventionally, a carburetor is placed in supply line 42 to meter and atomize fuel and air, the fuel being fed to the carburetor by a fuel supply pump or gravity. In the present invention, the conventional carburetor is eliminated, and under substantially all operating conditions, no metering of the fuel takes place through supply line 42 and intake manifold 38. Inserted, however, in supply line 42 is a mixing valve 43 which properly proportions air and fuel. Mixing valve 43 may be of any conventional type wherein drops of fuel are suspended in an air stream.

In a conventional engine, exhaust manifold 40 is normally connected directly through to the tail pipe through a muffler, and exhaust is passed through to the atmosphere at atmospheric pressure. In the present invention, a heat resistant throttle valve 45 is inserted in the exhaust manifold, preferably at the exhaust pipe connection to the manifold, and the throttle valve 45 is suitably controlled to regulate engine power. Exhaust pipe 46 is connected to the exhaust manifold 40 at 47. Exhaust pipe 46 connects to muffler 48 which in turn connects to tail pipe 50 which exhausts the gases to the atmosphere as shown by arrow 51.

Surrounding the exhaust manifold is a jacket or shroud 52 having sides 53 and rear end 55. At the front end of shroud 52, there is a downwardly extending portion 56 which forms a conduit from a bell-like scoop 57 which is open toward the fan 62. A thermostatically controlled shutter 60 is located at the throat of the bell and selectively admits or blocks cooling air which passes through connecting portion 56 to the interior of the shroud 52 over exhaust manifold 40. Vent pipe 61 permits the air to pass out the rear end of 55 of the shroud when the thermostatically controlled shutter 60 is open.

Cooling fan 62 acts in a conventional manner to pass air over the engine and, when the shutter 60 is in the open position passes air into the interior of shroud 52, permitting selective cooling of the exhaust manifold 40.

Referring to FIGURE 7 to control the exhaust valves 45 and the mixing valve 43, arms 63 on control bar 64 actuate links 65 and 67 so that an operator can, by selectively depressing the accelerator pedal 66, control through bar 64, arms 63, links 65 and 67, the selective and simultaneous opening of the throttle valves 45 in each of the exhaust manifolds. Link 67 is connected at one end through arm 63 to rod 64 and at the other end to mixing valve 43. Mixing valve 43 desirably has a metering valve which acts only during the idling of the engine so that a small quantity of a rich combustible mixture is permitted to pass to the engine cylinders to allow the engine to idle properly, when the throttle valves 45 are in the idling position and just vented when the maximum percentage of exhaust remains in the cylinders. Metering in the mixing valve 43 during the idling operation in valve 43 can be eliminated by a positive action vane pump or the like electrically or mechanically driven during the idling period when the suction is low.

The operation of the engine at one-third throttle will be described by reference to the structure set forth above and the graph depicted in FIGURE 2, wherein the abscissa is shown as the stroke in inches and the ordinate is shown as the pressure in pounds per square inch absolute. The performance of a conventional 4-cycle V-8 engine is shown by dotted lines, whereas the performance of the same engine modified with the invention is shown by the solid line. Reference will be made to the characteristic strokes common to all commercially successful internal combustion engines including (1) the compression of air, (2) the raising of air temperature by the combustion of fuel in this air at its elevated pressure, (3) the extraction of work from the heated air by expansion to the initial pressure and (4) exhaust.

Considering the conventional engine at one-third throttle, compression of air begins at 80 wherein the pressure in the cylinder at the beginning of the compression stroke is about one-half atmosphere wherein atmosphere is normally 14.7 pounds per sq. inch at sea level. The air-fuel mixture is then compressed, and ignition takes place at 81 at about 50 pounds per sq. inch pressure. The raising of the air temperature by combustion of fuel in this air results in a rapid increase in pressure which reaches a maximum of about 150 pounds per sq. inch at 82. The extraction of work takes place during the power stroke from 82 to 83 at which time the exhaust stroke begins and the exhaust portion of the cycle takes place from 83 to 84. The intake stroke takes place from 84 to 80 wherein the pressure within the cylinder is below atmosphere or in a partial vacuum. The total work obtained from the engine is the force exerted on the piston during the power stroke from 82 to 83, minus the work of compression.

As explained above, this vacuum is created by the metering restrictions, including the butterfly valve and the carburetor. The exact pressures at 80 to 84 vary somewhat with the details of the engine involved, and the various throttle settings and the graph set forth for illustrative purposes do show a comparison between the established art and the present invention.

In an engine modified with the present invention, the same cycles take place as set forth above, but the pressures within the cylinder during the various strokes are different from that which takes place in the conventional engine as described. Since throttling is being done at the exit of the exhaust manifold and no throttling is taking place on the intake side of the engine, no partial vacuum is created during the intake stroke. As seen in the graph of FIGURE 2, compression begins at 90 at atmospheric pressure, and as can be seen from the graph, well above the pressure at 80 at which compression begins in a conventional engine. The mixture is compressed during the compression stroke until ignition takes place at 91 at about 100 pounds per sq. inch. During burning of the fuel within the cylinder, a pressure is created within the cylinder of 300 pounds per sq. inch absolute at maximum pressure at 92. Power is exerted during the stroke of the piston from 92 to 93. Exhaust then takes place from 93 to atmospheric pressure or slightly above at 94. During the intake stroke, since there is no restriction on the intake side of the engine, there is a minimum of restriction, so that the pressure from 94 to 90 is not reduced, as it is from 84 to 80 in the conventional engine.

It will be seen from the comparison of the operation of a conventional engine and an engine modified with the invention, that a much greater amount of power is obtained when the engine is partially throttled. Such substantial increase in power, which indicates improved combustion, also results from the maintenance of a temperature in the exhaust manifold of from 700° to 1100° F. wherein the gases are more fully burned. Such temperature is maintained in the exhaust manifold 40 by means of the insulating shroud 52 described above wherein cooling air is normally blocked and only selectively admitted over the exhaust manifold 42. The selective admission of the air is controlled by operation of shutter 60 which is thermostatically actuated in any well known manner by sensing the temperature within the exhaust manifold 42 and suitably opening and closing the shutter 60. When the shutter 60 is closed, the temperature within the exhaust manifold rises quickly. The exhaust manifold cooling air, after it passes over the manifold, can be used for space heating or other purposes.

Any other obnoxious products from the engines, such as those from the engine crankcase can be fed into the intake manifold and mixed with the combustible mixture in the cylinder, and rendered harmless and smogless in the exhaust system.

It will be seen that by means of the present construction and operation, a substantially higher efficiency is achieved and great reduction in toxicity of gases is maintained over that of the prior art.

In some instances, where there may be incomplete combustion in the engine and exhaust system notwithstanding the elevated temperatures, a catalyst of any well known or developed type suitable for effecting full combustion at elevated temperatures, may optionally be suspended in the exhaust manifold as an alternative or supplement to the described system. Supplemental air can be pumped into the manifold, if necessary, whereby the oxygen in the pumped air can combine with the remaining unburned gases to effect complete combustion or cooling of the exhaust valves and seats.

Having thus described my invention what I claim as new and desire to secure by Letters Patent is:

1. In an internal combustion engine having an intake manifold and an exhaust manifold on the cylinders of the engine, a source of fuel and a source of air connected to the intake manifold, mixing means for mixing the air with the fuel, throttling means on the exhaust manifold for controlling the passage of exhaust gases from the engine, a shroud surrounding the exhaust manifold, cooling air passages extending within the shroud and over the exhaust manifold, and means for selectively varying the flow of cooling air to the passages to maintain the exhaust manifold at an elevated temperature range.

2. An engine of claim 1, wherein the elevated temperature range is above 700° F.

3. An engine of claim 1, wherein the shroud has a bell-like air inlet to permit entry of air to the passages surrounding the exhaust manifold.

4. An engine of claim 1, wherein the means for selectively varying the cooling air includes a thermostatically controlled shutter.

5. An engine of claim 1, in combination with means for selectively introducing air into the exhaust manifold to effect complete combustion of the exhaust gases.

References Cited

UNITED STATES PATENTS

| | | | |
|---|---|---|---|
| 890,272 | 6/1908 | Griffith. | |
| 1,416,352 | 5/1922 | Huntley. | |
| 2,293,632 | 8/1942 | Sauer | 60—30 |
| 3,116,725 | 1/1964 | Hadley. | |
| 3,124,930 | 3/1964 | Powers | 60—30 |
| 3,406,515 | 10/1968 | Behrens | 60—30 |

CARLTON R. CROYLE, Primary Examiner

D. HART, Assistant Examiner

U.S. Cl. X.R.
60—31; 123—97